United States Patent [19]

Chen

[11] 4,190,538
[45] Feb. 26, 1980

[54] PUMP SEAL FLUSH

[75] Inventor: Carl Chen, Newark, Del.

[73] Assignee: E. I. Du Pont de Nemours And Company, Wilmington, Del.

[21] Appl. No.: 945,062

[22] Filed: Sep. 22, 1978

[51] Int. Cl.² .................. B01D 25/08; B01D 25/32; B01D 29/20; B01D 35/02
[52] U.S. Cl. ........................... 210/167; 210/196; 210/416 R; 277/15; 277/24; 277/65; 417/370; 418/102
[58] Field of Search ............ 277/65, 15, 24; 417/370; 418/102; 210/194, 196, 74, 167, 168, 510, 416 R, 416 L

[56] References Cited
U.S. PATENT DOCUMENTS

| 3,088,744 | 5/1973 | Ezekiel et al. | 277/15 |
| 3,782,739 | 1/1974 | Kahanek et al. | 277/65 |
| 4,088,576 | 5/1978 | Mott | 210/510 |

OTHER PUBLICATIONS

"Application and Product News", Mott Metallurgical Corp.
"Pump Handbook", Karassik et al., McGraw-Hill, 1976; pp. 2-75 & 2-76.

Primary Examiner—Frank Sever

[57] ABSTRACT

An inertial filter is installed in the discharge of a pump which is used to transfer slurries, and the filtrate stream from the filter serves as the pump seal flush.

2 Claims, 3 Drawing Figures

PUMP SEAL FLUSH

BACKGROUND OF THE INVENTION

In many chemical processes pumps are used to transfer liquids. Many of these pumps employ mechanical seals to avoid leakage around the pump shaft. These seals usually consist of a rotating and a stationary element having sealing faces which are perpendicular to the pump shaft and in sliding contact. The faces are polished, lubricated parts held together under a pressure sufficient to prevent escape of the liquid being pumped.

The mechanical seals are usually contacted with a sealing liquid, i.e., a pump seal flush. This flush serves the purpose of lubricating and cooling the sealing faces and also helps prevent the leakage of air or liquid around the pump shaft. In many pumps the seal flush is the same liquid being moved by the pump; in other pumps a seal flush is supplied from an external source and can be a different liquid.

When a pump is being used to transfer a liquid slurry, problems can be created if the slurry is used as the seal flush. The solids present in the slurry will often cause a stoppage in the seal flush line, thus preventing flow. Also, if the solids are hard or abrasive, they can shorten the useful life of the sealing faces of the seal.

SUMMARY OF THE INVENTION

The above problems are avoided if an inertial filter is installed in the discharge line of the pump. This filter provides an essentially solids-free filtrate which can be recycled to the pump as the seal flush.

The process of the invention provides a seal flush that gives the desired cooling and lubricating functions without introducing harmful solids into the seal, thus increasing seal life. Furthermore, the liquid employed is the same as that being transferred by the pump, thus no contaminant is introduced into the system nor is an additional source of liquid required. Also, the inertial filters employed are self-cleaning, thus the employment of parallel filters or routine stoppages for backflushing are not necessary and continuous operation can be achieved.

DESCRIPTION OF THE INVENTION

The process of the invention is applicable to any pump that is used to move liquids and has a mechanical seal. Examples of such pumps are centrifugal pumps, propeller pumps, rotary pumps and reciprocations pumps; although because of their widespread use to pump slurries, the process will be particularly applicable to centrifugal pumps.

The nature of the liquid being moved is not critical as long as it is a pumpable slurry, i.e., contains undissolved solids. The particle size of the particles in the slurry is only important to the extent the size will determine the porosity of the filter element employed.

The process of the invention will now be described with reference to the drawings.

A slurry is introduced in a pump 2 through line 1. The slurry is then discharged from the pump through line 3. Part or all of the slurry is then fed through line 4 into an inertial filter 5. The amount of slurry fed through the filter is not critical and the only requirement is that sufficient filtrate is produced by the filter to serve as the seal flush. The part of the slurry not introduced into the filter can flow through by-pass line 8. The use of the by-pass will be advantageous when the pump discharge rate is high and only small amount of liquid is needed to flush the seal.

Figure 1:
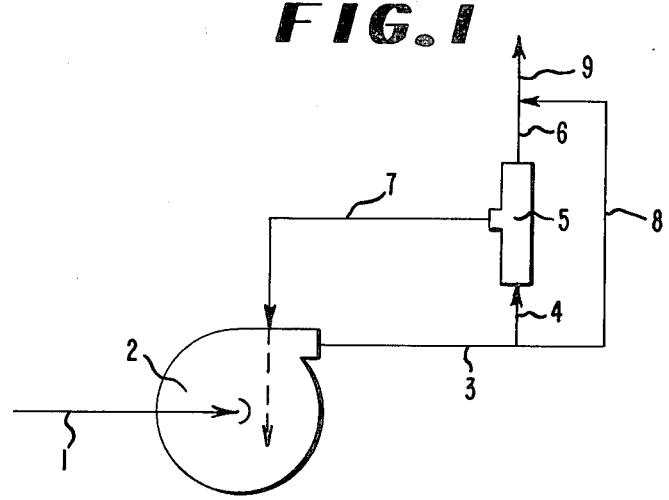
FIG. 1 is a flow sheet of the process of the invention.
Figure 2:
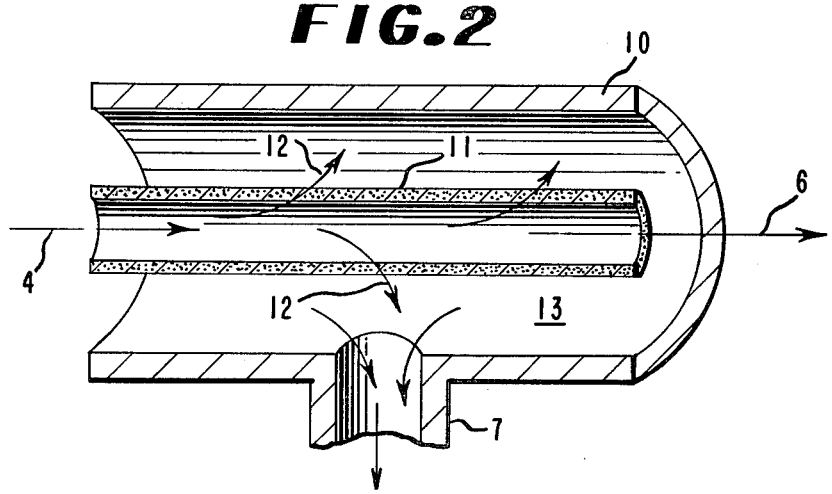
FIG. 2 is a schematic drawing of an inertial filter useful in the process of the invention.

The inertial filter 5 is illustrated in more detail in FIG. 2. It is composed of an impervious cylindrical shell 10 having positioned within the shell a porous tube 11. The slurry 4 is introduced into the tube; and as it flows through the tube, an essentially solids-free filtrate 12 is produced in the annular chamber 13 within the shell. By "essentially solids-free" it is meant that the porosity of the tube 11 is such that only solids of such a size that will not be harmful to the seal are permitted in the filtrate, which is then fed to the seal of the pump through line 7. The particular matter above the desired size in the moving liquid will have too much inertia to turn and flow into the porous tube and consequently will continue straight down the tube and out through line 6.

The rate the slurry flows through the filter is not critical and the only requirement is that the filter remains self-cleaning. The self-cleaning effect is related to particle size; and in most embodiments of the invention the slury should move through the filter at a rate of not less than 1 foot/second, and usually at 12–20 feet/second.

Inertial filter units 5 are commercially available. An inertial filter useful in the process of the invention having a stainless steel powdered metal filter tube 11 is available from Mott Metallurgical Corporation of Farmington, Conn. However, the filter tube 11 can be made from other porous materials, e.g., other sintered powdered metals, screws, gauzes, polymers, etc. Because of the controlled porosity provided, the use of porous metals is preferred for most embodiments. Porous metal tubes are available which can filter solids having particle sizes which range from 0.1–100 microns or more.

The pore size employed for the filter tube will depend upon the viscosity of the slurry, the size of the solid particles in the slurry and their concentration, the thickness of the tube, back pressure and the flow rate. The determination of the proper pore size for any particular slurry is within the skill of an engineer. For example, a slurry of 2% solids in water moving at a rate of 1–10 gpm, the slurry having a viscosity of 1 cp and the solids having a particle size of 0.1–5 microns has been successfully filtered using inertial filter having a pore size rating of 0.5 microns and a filter tube wall thickness of 0.08 inches.

In some embodiments it will be desirable to install a valve or other restricting device, (not illustrated) in the line 6 leaving inertial filter. This valve can act to increase the static pressure within the porous tube, thus causing the flow of liquid through the porous wall. In other embodiments it may be desirable to use multiple filter tubes within the shell.

The mainstream effluent from the inertial filter flow through line 6 and, in some embodiments, is joined with by-pass line 8 to form stream 9.

The filtrate 12 from the filter flows through line 7 to the pump as the seal flush. If desired, line 7 can contain a rotameter or other liquid flow measuring device. The rotameter will sense the amount of flush; and if it is below the amount required, will activate an alarm.

Figure 3:
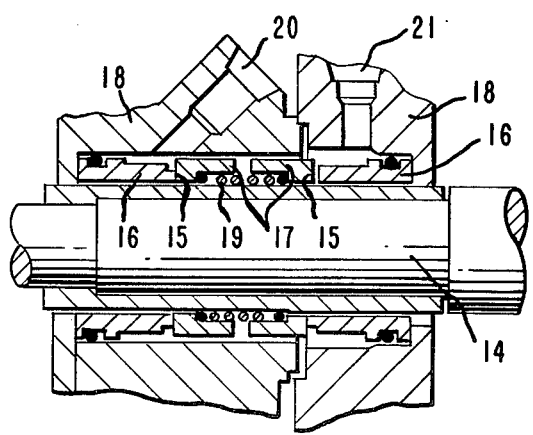
FIG. 3 is a drawing of a typical double mechanical seal in a pump.

The invention is particularly applicable to pumps having a single mechanical seal as such pumps usually employ the liquid being transferred as the seal. However, the invention is not so limited and FIG. 3 illustrates how the seal flush can be applied to a double mechanical seal within a pump.

Within the pump the shaft 14 is sealed between the impeller (not illustrated) and the drive means (not illustrated) by two sealng faces 15. These faces are created by stationary element 16 being in sliding contact with rotating element 17. The elements are held in sliding contact by action of the spring 19.

The clean filtrate in line 7 enters into the pump housing 18 through connections 20 and 21 and is directed toward the seal where it provides the desired sealing, cooling and lubricating functions.

I claim:

1. Apparatus for flushing a pump seal comprising
   (i) a pump having a mechanical seal,
   (ii) the discharge line of said pump being connected to an inertial filter, said filter comprising an impervious shell having an inlet and two outlets, the inlet and one outlet being connected by a cylindrical porous filter element centrally disposed within said shell, the other outlet communicating with an annulus for filtrate between the shell and the filter element, the filter element having a porosity such that the filtrate will be essentially solids free and the filter element self-cleaning, and
   (iii) the filter having two discharge lines connected to the outlets, the discharge line for filter filtrate being connected to the pump and communicating to the mechanical seal.

2. The apparatus of claim 1 wherein the porous element is a porous metal tube and the shell is cylindrical in shape.

* * * * *